(12) United States Patent
Mekkattuparamban et al.

(10) Patent No.: US 11,102,059 B2
(45) Date of Patent: Aug. 24, 2021

(54) VIRTUAL NETWORK HEALTH CHECKER

(71) Applicant: Cisco Technology, Inc., San Jose, CA (US)

(72) Inventors: Joji Thomas Mekkattuparamban, Sunnyvale, CA (US); Michael Robinson, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/825,072

(22) Filed: Mar. 20, 2020

(65) Prior Publication Data

US 2020/0228394 A1 Jul. 16, 2020

Related U.S. Application Data

(63) Continuation of application No. 14/802,910, filed on Jul. 17, 2015, now Pat. No. 10,601,642.

(60) Provisional application No. 62/167,787, filed on May 28, 2015.

(51) Int. Cl.
*H04L 12/24* (2006.01)
*G06F 11/28* (2006.01)
*H04L 12/26* (2006.01)

(52) U.S. Cl.
CPC .......... *H04L 41/0672* (2013.01); *G06F 11/28* (2013.01); *H04L 43/0817* (2013.01); *H04L 43/065* (2013.01)

(58) Field of Classification Search
CPC ............. H04L 41/0672; H04L 43/0817; H04L 43/065; G06F 11/28
See application file for complete search history.

(56) References Cited

U.S. PATENT DOCUMENTS

| 5,113,187 | A | 5/1992 | Gorshe |
| 6,389,586 | B1 | 5/2002 | McElvain |
| 8,180,891 | B1 | 5/2012 | Harrison |
| 9,569,255 | B1 * | 2/2017 | Johnson ............... G06F 9/4806 |
| 2002/0154646 | A1 | 10/2002 | Dubois et al. |

(Continued)

FOREIGN PATENT DOCUMENTS

EP 0319185 A2 6/1989

OTHER PUBLICATIONS

Summons to attend oral proceedings pursuant to Rule 115(1) EPC, issued by the European Patent Office for EP Application No. 16732374.0 dated Jan. 29, 2021, 8 pages.

(Continued)

*Primary Examiner* — Jimmy H Tran
(74) *Attorney, Agent, or Firm* — Polsinelli PC

(57) ABSTRACT

Systems, methods, and computer-readable storage media are provided for managing status of state machines in a computing network. Various embodiments of the present technology can be used to track and maintain an active log associated with each state machine in a computing network. The active log of a state machine can be periodically analyzed at a predetermined time interval to determine an anticipated state of the state machine and a current state of the state machine. In response to determining that the state machine is in an inconsistent state (i.e., the anticipated state does not match the current state of the state machine), a suitable action can be taken to switch the current state of the state machine from the inconsistent state to a suitable new state.

20 Claims, 6 Drawing Sheets

(56) References Cited

U.S. PATENT DOCUMENTS

| | | | |
|---|---|---|---|
| 2003/0061361 A1* | 3/2003 | Bacik | H04L 69/329 709/228 |
| 2005/0283373 A1* | 12/2005 | Lamport | G06F 11/2041 714/11 |
| 2006/0018330 A1* | 1/2006 | Choubal | G06F 13/1605 370/411 |
| 2006/0233186 A1* | 10/2006 | Portolani | H04L 45/18 370/408 |
| 2007/0003347 A1* | 1/2007 | Manfredi | G06F 9/542 400/62 |
| 2009/0216881 A1 | 8/2009 | Lovy et al. | |
| 2010/0262650 A1 | 10/2010 | Chauhan et al. | |
| 2010/0325391 A1 | 12/2010 | Talla | |
| 2011/0153546 A1* | 6/2011 | Latta | G06N 5/00 706/54 |
| 2012/0151272 A1* | 6/2012 | Behrendt | G06F 11/203 714/39 |
| 2012/0226920 A1* | 9/2012 | Strumpf | H04B 3/54 713/300 |
| 2013/0208880 A1 | 8/2013 | Lovy et al. | |
| 2014/0180703 A1* | 6/2014 | Mansker | G16H 30/00 705/2 |
| 2015/0088827 A1* | 3/2015 | Xu | G06F 3/065 707/634 |
| 2015/0277802 A1 | 10/2015 | Oikarinen et al. | |
| 2015/0277969 A1 | 10/2015 | Strauss et al. | |
| 2015/0378774 A1 | 12/2015 | Vermeulen | |
| 2015/0378775 A1* | 12/2015 | Vermeulen | G06F 16/1748 707/692 |
| 2015/0379062 A1* | 12/2015 | Vermeulen | G06F 16/2358 707/691 |
| 2016/0070589 A1 | 3/2016 | Vermeulen et al. | |
| 2016/0070740 A1* | 3/2016 | Vermeulen | G06F 16/2322 707/703 |
| 2016/0085772 A1 | 3/2016 | Vermeulen et al. | |
| 2017/0177419 A1* | 6/2017 | Fitzpatrick | G06F 9/542 |
| 2017/0244627 A1 | 8/2017 | Lovy et al. | |

OTHER PUBLICATIONS

Fronza. Ilenia, et al., "Failure prediction based on log files using Random Indexing and Support Vector Machines," The Journal of Systems and Software, 2013, 10 pages.

International Search Report & Written Opinion dated Aug. 19, 2016 for corresponding PCT Application No. PCT/US2016/034703.

* cited by examiner

VIRTUAL NETWORK HEALTH CHECKER

CROSS-REFERENCE TO RELATED APPLICATIONS

This application is a continuation of U.S. patent application Ser. No. 14/802,910 filed on Jul. 17, 2015, which claims the benefit of U.S. Provisional Patent Application Ser. No. 62/167,787 filed May 28, 2015, the contents of which are incorporated by reference in their entireties.

TECHNICAL FIELD

The present technology relates in general to the field of computer networks, and more specifically to methods and systems for managing a state machine.

BACKGROUND

Modern computing networks operate with an increasing number of computing nodes to support a wide variety of applications and services. Computing nodes in the networks may include a switch (e.g., a router) or an end point (e.g., a host device). A computing node can be a state machine and operate on an input to change the status and/or cause an action to take place for a given change.

However, it's a challenge to ensure that a state machine is not in an inconsistent state or does not remain in an inconsistent state for an extended period of time. This problem becomes even more challenging when complexities of state machines increase beyond moderate levels and can be exposed to corner cases and race conditions.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only examples of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
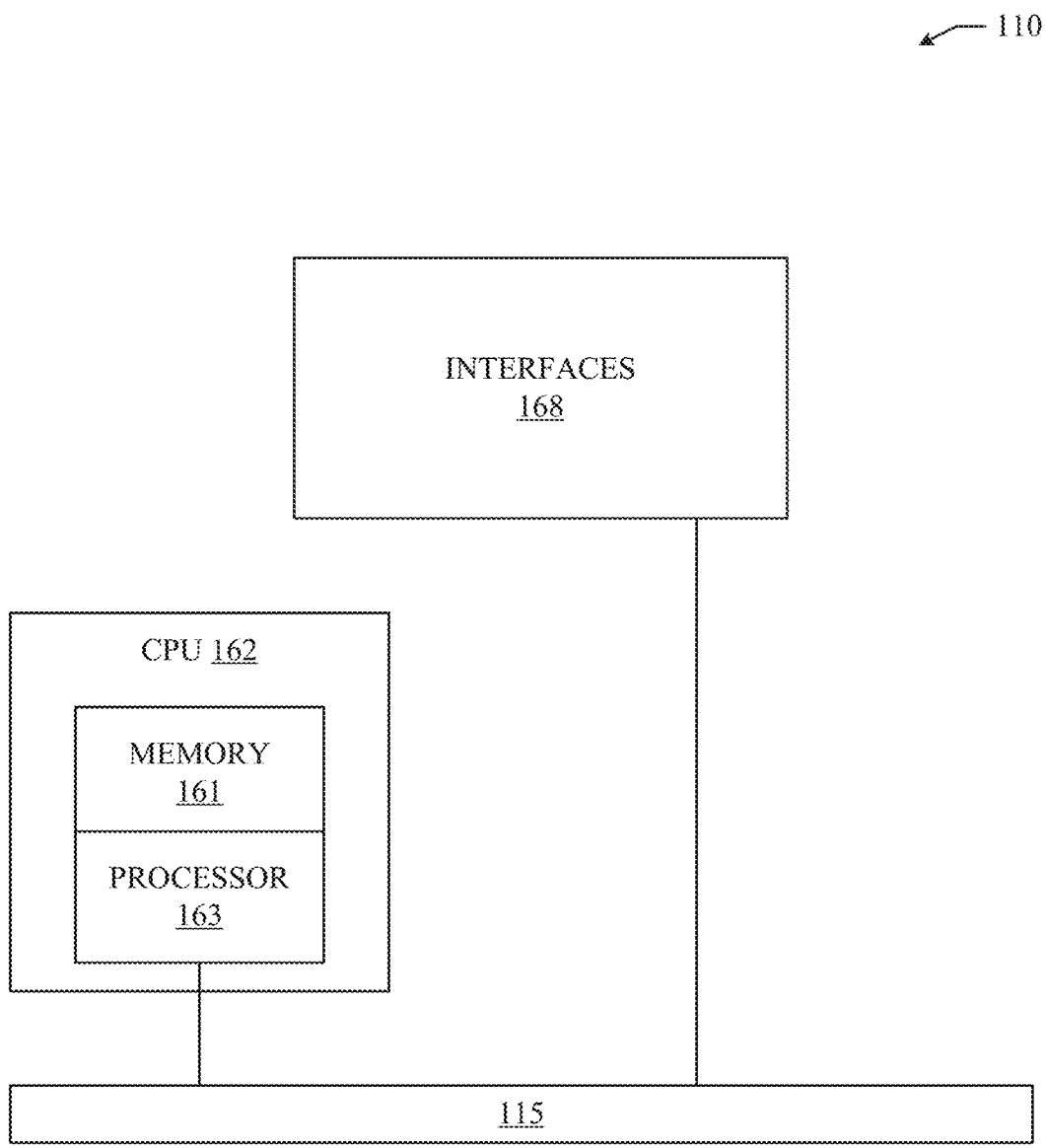
FIG. 1 illustrates an example network device according to some aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview:

Disclosed are systems, methods, and computer-readable storage media for managing states of state machines in a computing network. Various embodiments of the present technology can be used to track and maintain an active log associated with each state machine in a computing network. The active log of a state machine can be periodically analyzed at a predetermined time interval to determine an anticipated state of the state machine and a current state of the state machine. In response to determining that the state machine is in an inconsistent state (i.e., the anticipated state does not match the current state of the state machine), a suitable action can be taken to switch the current state of the state machine from the inconsistent state to a suitable new state.

DETAILED DESCRIPTION

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which virtual machines (VMs) communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments; networks; devices; ports; physical or logical links; and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

Disclosed are systems and methods for managing states of a state machine in a computing network. A brief introductory description of an exemplary systems and networks, as illustrated in FIGS. 1 through 4, is disclosed herein. A detailed description of a health checker, and example variations, will then follow. These variations shall be described as the various embodiments are set forth. The disclosure now turns to FIG. 1.

FIG. 1 illustrates an exemplary network device 110 suitable for implementing the present technology. Network device 110 includes a master central processing unit (CPU) 162, interfaces 168, and a bus 115 (e.g., a PCI bus). When acting under the control of appropriate software or firmware, the CPU 162 is responsible for executing packet management, error detection, and/or routing functions, such policy enforcement, for example. The CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the network device 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control, and management. By providing separate processors for the communications intensive tasks, these interfaces allow the master microprocessor 162 to efficiently perform routing computations, network diagnostics, security functions, etc.

Although the system shown in FIG. 1 is one specific network device of the present technology, it is by no means the only network device architecture on which the present technology can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 2A:
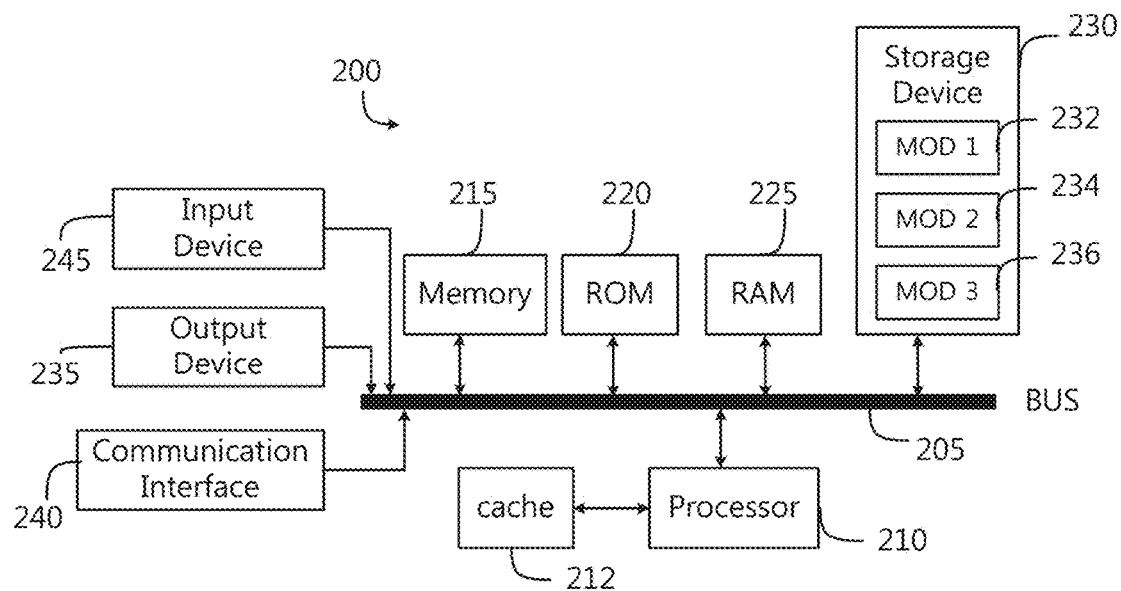
FIGS. 2A and 2B illustrate an example system embodiment according to some aspects of the subject technology.
Figure 2B:
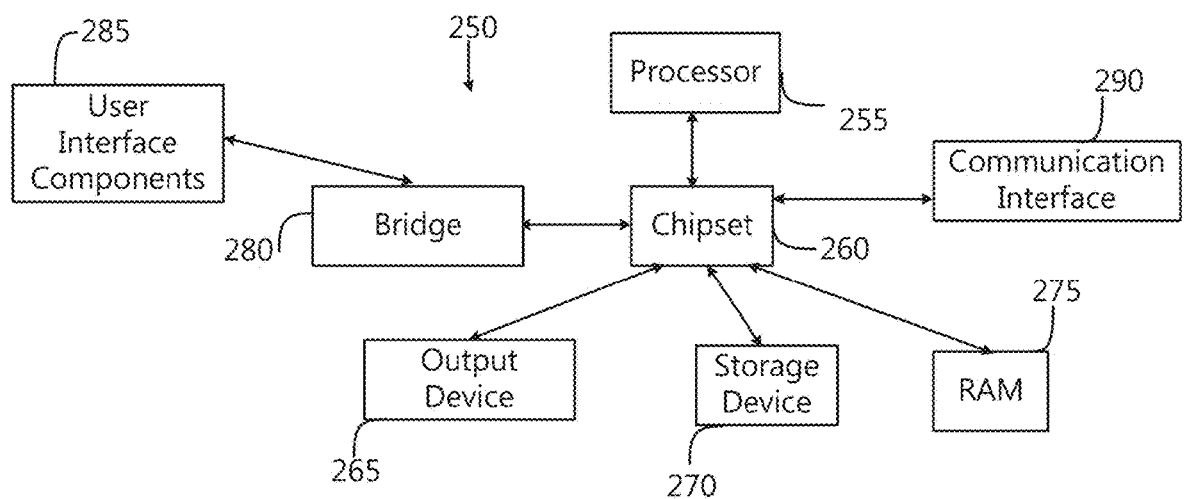

FIG. 2A, and FIG. 2B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255.

It can be appreciated that exemplary systems 200 and 250 can have more than one processor 210 or be part of a group or cluster of computing devices networked together to provide greater processing capability.

Figure 3:
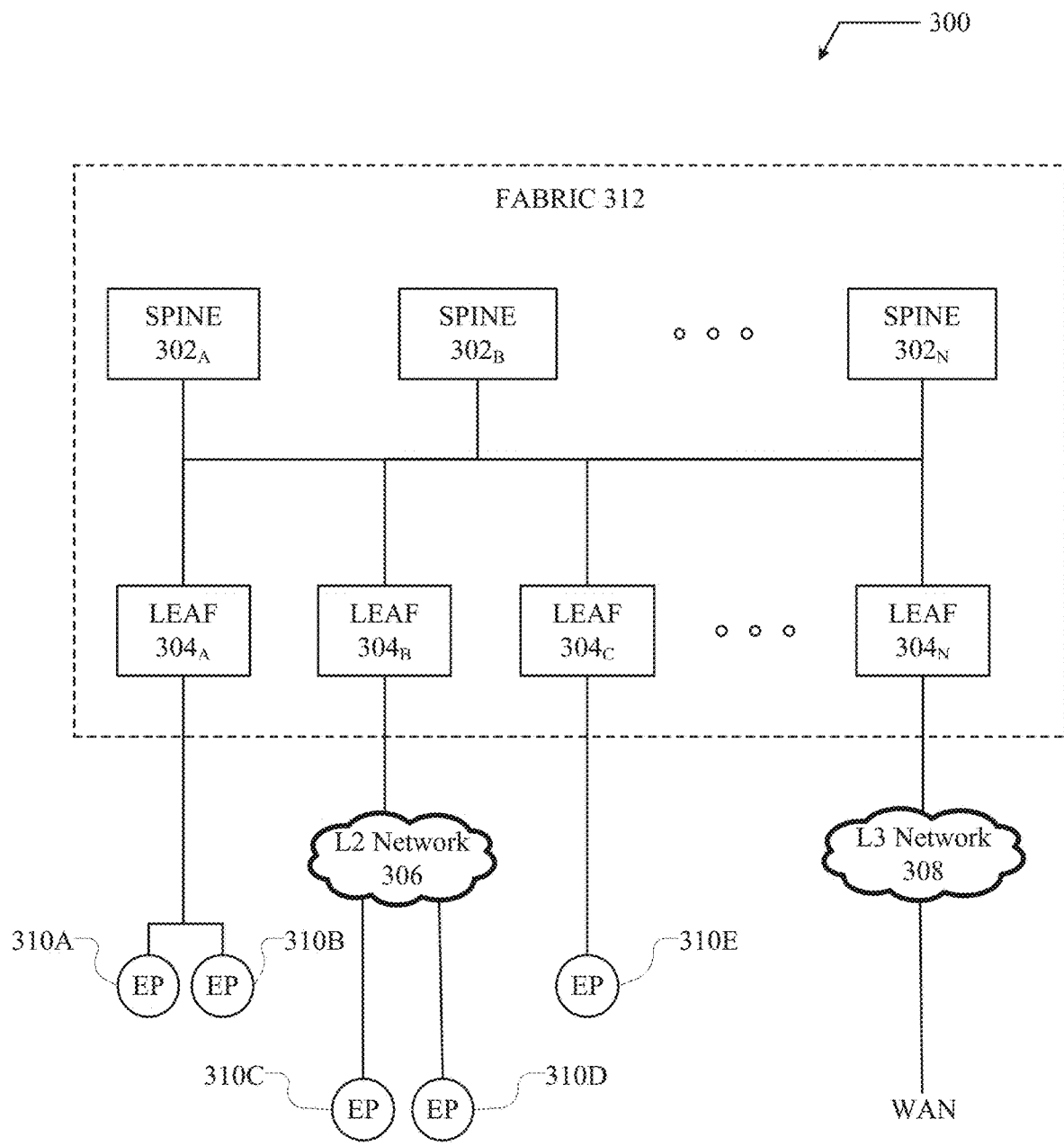
FIG. 3 illustrates a schematic block diagram of an example architecture for a network fabric.

FIG. 3 illustrates a schematic block diagram of an example architecture 300 for a network fabric 312. The network fabric 312 can include spine switches 302A, 302B, . . . , 302N (collectively "302") connected to leaf switches 304A, 304B, 304c . . . 304N (collectively "304") in the network fabric 312.

Spine switches 302 can be L3 switches in the fabric 312. However, in some cases, the spine switches 302 can also, or otherwise, perform L2 functionalities. Further, the spine switches 302 can support various capabilities, such as 40 or 10 Gbps Ethernet speeds. To this end, the spine switches 302 can include one or more 40 Gigabit Ethernet ports. Each port can also be split to support other speeds. For example, a 40 Gigabit Ethernet port can be split into four 10 Gigabit Ethernet ports.

In some embodiments, one or more of the spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated, tenant packet to get to the destination locator address of the tenant. The spine switches 302 can then perform a lookup of their local mapping database to determine the correct locator address of the packet and forward the packet to the locator address without changing certain fields in the header of the packet.

When a packet is received at a spine switch 302, the spine switch 3021 can first check if the destination locator address is a proxy address. If so, the spine switch 3021 can perform the proxy function as previously mentioned. If not, the spine switch 3021 can look up the locator in its forwarding table and forward the packet accordingly.

Spine switches 302 connect to leaf switches 304 in the fabric 312. Leaf switches 304 can include access ports (or non-fabric ports) and fabric ports. Fabric ports can provide uplinks to the spine switches 302, while access ports can provide connectivity for devices, hosts, endpoints, VMs, or external networks to the fabric 312.

Leaf switches 304 can reside at the edge of the fabric 312, and can thus represent the physical network edge. In some cases, the leaf switches 304 can be top-of-rack ("ToR") switches configured according to a ToR architecture. In other cases, the leaf switches 304 can be aggregation switches in any particular topology, such as end-of-row (EoR) or middle-of-row (MoR) topologies. The leaf switches 304 can also represent aggregation switches, for example.

The leaf switches 304 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 304 can contain virtual switching functionalities, such as a virtual tunnel endpoint (VTEP) function as explained below in the discussion of VTEP 408 in FIG. 4. To this end, leaf switches 304 can connect the fabric 312 to an overlay network, such as overlay network 400 illustrated in FIG. 4.

Network connectivity in the fabric 312 can flow through the leaf switches 304. Here, the leaf switches 304 can provide servers, resources, endpoints, external networks, or VMs access to the fabric 312, and can connect the leaf switches 304 to each other. In some cases, the leaf switches 304 can connect EPGs to the fabric 312 and/or any external networks. Each EPG can connect to the fabric 312 via one of the leaf switches 304, for example.

Endpoints 310A-E (collectively "310") can connect to the fabric 312 via leaf switches 304. For example, endpoints 310A and 310B can connect directly to leaf switch 304A, which can connect endpoints 310A and 310B to the fabric 312 and/or any other one of the leaf switches 304. Similarly, endpoint 310E can connect directly to leaf switch 304C, which can connect endpoint 310E to the fabric 312 and/or any other of the leaf switches 304. On the other hand, endpoints 310C and 310D can connect to leaf switch 304B via L2 network 306. Similarly, the wide area network (WAN) can connect to the leaf switches 304C or 304D via L3 network 308.

Endpoints 310 can include any communication device, such as a computer, a server, a switch, a router, etc. In some cases, the endpoints 310 can include a server, hypervisor, or switch configured with a VTEP functionality which connects an overlay network, such as overlay network 400 below, with the fabric 312. For example, in some cases, the endpoints 310 can represent one or more of the VTEPs 408A-D illustrated in FIG. 4. Here, the VTEPs 408A-D can connect to the fabric 312 via the leaf switches 304. The overlay network can host physical devices, such as servers, applications, EPGs, virtual segments, virtual workloads, etc. In addition, the endpoints 310 can host virtual workload(s), clusters, and applications or services, which can connect with the fabric 312 or any other device or network, including an external network. For example, one or more endpoints 310 can host, or connect to, a cluster of load balancers or an EPG of various applications.

Although the fabric 312 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Figure 4:
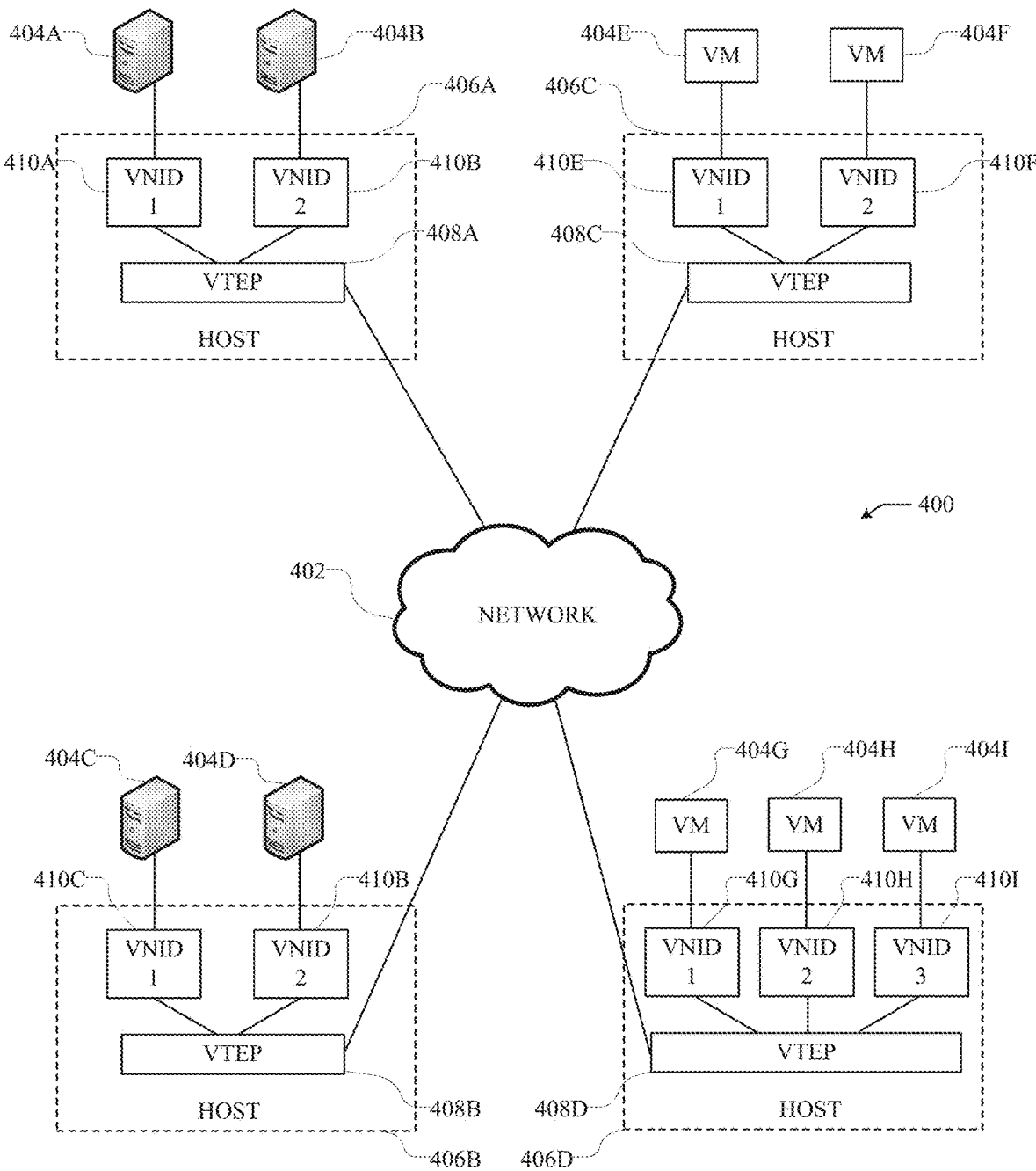
FIG. 4 illustrates an example overlay network.

FIG. 4 illustrates an exemplary overlay network 400. Overlay network 400 uses an overlay protocol, such as VXLAN, VGRE, VO3, or STT, to encapsulate traffic in L2 and/or L3 packets which can cross overlay L3 boundaries in the network. As illustrated in FIG. 4, overlay network 400 can include hosts 406A-D interconnected via network 402.

Network 402 can include a packet network, such as an IP network, for example. Moreover, network 402 can connect the overlay network 400 with the fabric 312 in FIG. 3. For example, VTEPs 408A-D can connect with the leaf switches 304 in the fabric 312 via network 402.

Hosts 406A-D include virtual tunnel end points (VTEP) 408A-D, which can be virtual nodes or switches configured to encapsulate and de-encapsulate data traffic according to a specific overlay protocol of the network 400, for the various virtual network identifiers (VNIDs) 410A-I. Moreover, hosts 406A-D can include servers containing a VTEP functionality, hypervisors, and physical switches, such as L3 switches, configured with a VTEP functionality. For example, hosts 406A and 406B can be physical switches configured to run VTEPs 408A-B. Here, hosts 406A and 406B can be connected to servers 404A-D, which, in some cases, can include virtual workloads through VMs loaded on the servers, for example.

In some embodiments, network 400 can be a VXLAN network, and VTEPs 408A-D can be VXLAN tunnel end points (VTEP). However, as one of ordinary skill in the art will readily recognize, network 400 can represent any type of overlay or software-defined network, such as NVGRE, STT, or even overlay technologies yet to be invented.

The VNIDs can represent the segregated virtual networks in overlay network 400. Each of the overlay tunnels (VTEPs 408A-D) can include one or more VNIDs. For example, VTEP 408A can include VNIDs 1 and 2, VTEP 408B can include VNIDs 1 and 2, VTEP 408C can include VNIDs 1 and 2, and VTEP 408D can include VNIDs 1-3. As one of ordinary skill in the art will readily recognize, any particular VTEP can, in other embodiments, have numerous VNIDs, including more than the 3 VNIDs illustrated in FIG. 4.

The traffic in overlay network 400 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Servers 404A-D and VMs 404E-I can connect to their respective VNID or virtual segment, and communicate with other servers or VMs residing in the same VNID or virtual segment. For example, server 404A can communicate with server 404C and VMs 404E and 404G because they all reside in the same VNID, viz., VNID 1. Similarly, server 404B can communicate with VMs 404F and 404H because they all reside in VNID 2. VMs 404E-I can host virtual workloads, which can include application workloads, resources, and services, for example. However, in some cases, servers 404A-D can similarly host virtual workloads through VMs hosted on the servers 404A-D. Moreover, each of the servers 404A-D and VMs 404E-I can represent a single server or VM, but can also represent multiple servers or VMs, such as a cluster of servers or VMs.

VTEPs 408A-D can encapsulate packets directed at the various VNIDs 1-3 in the overlay network 400 according to the specific overlay protocol implemented, such as VXLAN, so traffic can be properly transmitted to the correct VNID and recipient(s). Moreover, when a switch, router, or other network device receives a packet to be transmitted to a recipient in the overlay network 400, it can analyze a routing table, such as a lookup table, to determine where such packet needs to be transmitted so the traffic reaches the appropriate recipient. For example, if VTEP 408A receives a packet from endpoint 404B that is intended for endpoint 404H, VTEP 408A can analyze a routing table that maps the intended endpoint, endpoint 404H, to a specific switch that is configured to handle communications intended for endpoint 404H. VTEP 408A might not initially know, when it receives the packet from endpoint 404B, that such packet should be transmitted to VTEP 408D in order to reach endpoint 404H. Accordingly, by analyzing the routing table, VTEP 408A can lookup endpoint 404H, which is the intended recipient, and determine that the packet should be transmitted to VTEP 408D, as specified in the routing table based on endpoint-to-switch mappings or bindings, so the packet can be transmitted to, and received by, endpoint 404H as expected.

However, continuing with the previous example, in many instances, VTEP 408A may analyze the routing table and fail to find any bindings or mappings associated with the intended recipient, e.g., endpoint 404H. Here, the routing table may not yet have learned routing information regarding endpoint 404H. In this scenario, the VTEP 408A may likely broadcast or multicast the packet to ensure the proper switch associated with endpoint 404H can receive the packet and further route it to endpoint 404H.

In some cases, the routing table can be dynamically and continuously modified by removing unnecessary or stale entries and adding new or necessary entries, in order to maintain the routing table up-to-date, accurate, and efficient, while reducing or limiting the size of the table.

As one of ordinary skill in the art will readily recognize, the examples and technologies provided above are simply for clarity and explanation purposes, and can include many additional concepts and variations.

Depending on the desired implementation in the network 400, a variety of networking and messaging protocols may be used, including but not limited to TCP/IP, open systems interconnection (OSI), file transfer protocol (FTP), universal plug and play (UpnP), network file system (NFS), common internet file system (CIFS), AppleTalk etc. As would be appreciated by those skilled in the art, the network 400 illustrated in FIG. 4 is used for purposes of explanation, a network system may be implemented with many variations, as appropriate, in the configuration of network platform in accordance with various embodiments of the present disclosure.

Figure 5:
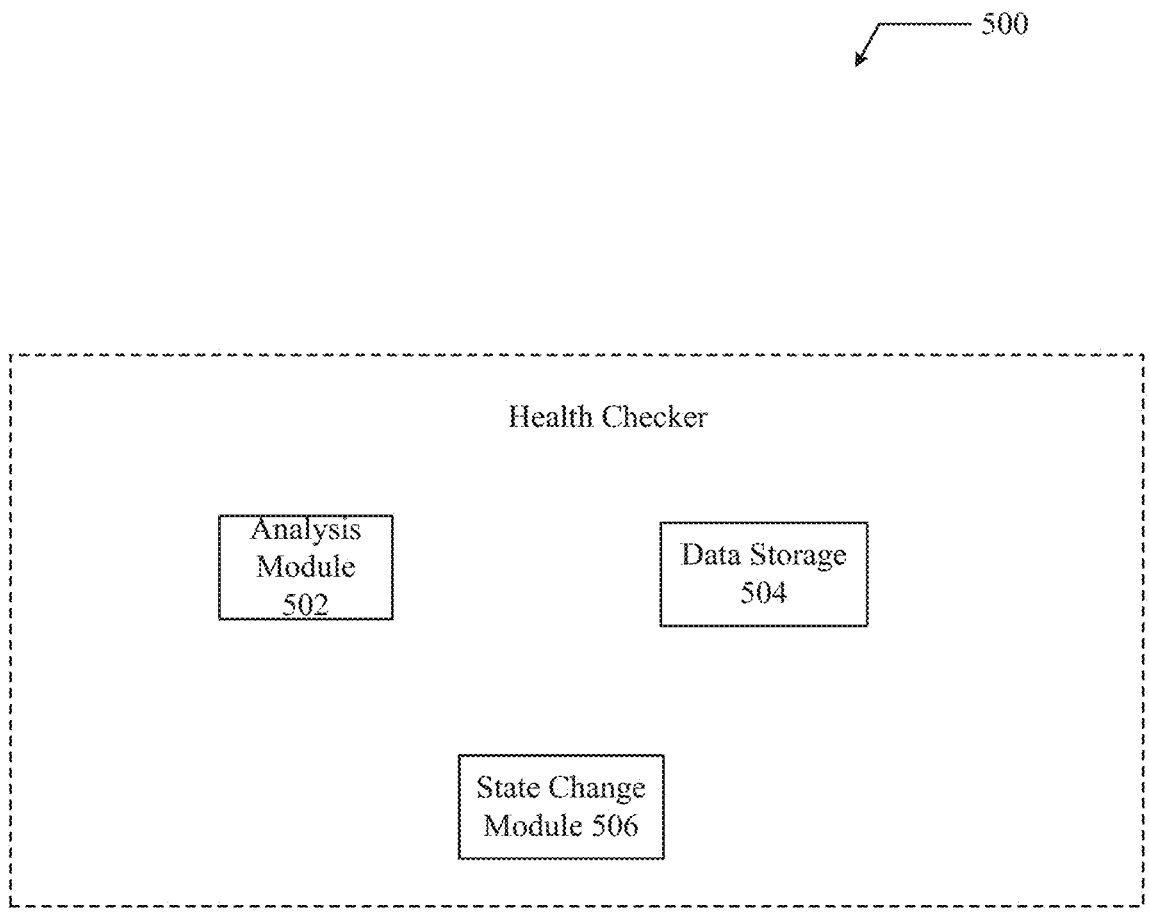
FIG. 5 illustrates an example health checker for managing a state machine according to some aspects of the subject technology.

FIG. 5 illustrates an example health checker 500 for managing a state machine according to some aspects of the subject technology. The health checker 500 can be made up of one or more computing nodes in a computing network. For example, the health checker 500 can be made up of one or more switches, routers, end points, computing devices, etc., or combination thereof in the computing network. The heath checker 500 and its components can reside in any computing device in the computing network either separately or as whole unit.

The health checker 500 can be configured to monitor the health of a state machine and determine whether the state machine is in an inconsistent state. If the health checker 500 determines that a state machine is in an inconsistent sate, the health checker 500 can cause the state machine to change from the inconsistent state to a new state.

A state machine can be any of a plurality of network devices at the computing network and may be any device capable of receiving or transmitting a packet at the computing network, such as an intermediate network node (e.g., a router) and a switch. Each state of a state machine can correspond to one or more specific actions that the state machine can perform in the respective state. For example, when the state machine is in an "initialization" state, only a specific action of "initialization" can be performed on the state machine. Other actions that are inconsistent with the "initialization" state may be prohibited. Further, in some embodiments, when a state machine is in a specific state, the state machine can only transition to one or more particular states such that transitions to other states can be prohibited.

To determine whether a state machine is in an inconsistent state, the health checker 500 can be configured to determine a current state of the state machine and an anticipated state of the state machine, and determine whether the current state and anticipated state are inconsistent with each other.

A current state of a state machine is the state that the state machine is currently in, whereas an anticipated state of the state machine is a state that the state machine should be in according to events that have happened on the state machine and/or other factors. Software systems on a state machine may be event-driven, meaning that the state machine may continuously wait for an occurrence of a specific external or internal event. Each state of the state machine can be a result of an occurrence of a particular set of external or internal events.

An event can be any type of action, input, output, etc., received or performed by the state machine. For example, past events on the state machine may indicate that a message was sent by the state machine and the state machine has been awaiting a reply. After an anticipated time period, the reply should have arrived. The anticipated state should be a state that is consistent with the reply having arrived rather than waiting for the reply.

Health checker 500 can include an analysis module 502 configured to determine whether a state machine is in an inconsistent state. For example, the analysis module 502 can determine the current and anticipated state of the state machine to determine whether the state machine is in an inconsistent state. In some embodiments, the analysis module 502 can determine whether a state machine is in an inconsistent state periodically, such as according to a predefined schedule. As another example, the analysis module 502 can determine whether a state machine is in an inconsistent state in response to occurrence of specified events such as the state machine rebooting.

The analysis module 502 can determine the current state of a state machine in numerous ways. For example, in some embodiments, the analysis module 502 can query the state machine for the current state of the state machine. As another example, the analysis module can analyze an active log of the state machine to determine the current state of the state machine. The active log can list events, either internal or external, that have occurred on or been performed by a particular state machine, as well as include metadata describing the events, such as the time that the events occurred. For example, the active log can include checkpoints for continued operations or configuration events that have occurred on the particular state machine. The configuration events or any other event on the state machine may include external or internal events such as a mouse click, a button press, a time tick, sending a data packet, arrival of a data packet, etc. Each state machine can maintain an active log and the analysis module 502 can be configured to access the active log of a state machine to analyze the events and determine a current state of the state machine.

The analysis module 502 can determine the anticipated state of a state machine in numerous ways. For example, in some embodiments, the analysis module 502 can determine the anticipated state of a state machine using a table of possible states of a state machine. The table can list possible states of a state machine, events that can result in a specific state of the state machine, actions that the state machine can perform while in a specific, or all states that a specific state of the state machine is allowed to transition to.

The health checker 500 can include a data storage 504 configured to maintain the table. The analysis module 502 can communicate with the data storage 504 to access the table to determine the anticipated state of a state machine. The analysis module 502 can compare the events that have occurred on the state machine to the table to determine the anticipated state of the state machine based on the events.

In some embodiments, the analysis module 502 may determine an anticipated state of a state machine using one or more machine-learning algorithms based upon data stored in an active log of the state machine. For example, one or more machine-learning algorithms can be pre-trained using historical data stored in the active log of the state machine or active logs of other state machines to determine the anticipated state of the state machine.

In some embodiments, the analysis module 502 can determine an anticipated state of a state machine based upon states of other state machines that the state machine has been in communication with. For example, if a state machine is waiting for a reply as a result of having transmitted a message to another state machine, the analysis module 502 may query the other state machine to determine whether the other state machine received the message and/or if a reply message has been transmitted by the other state machine.

The analysis module 502 can compare the current state of the state machine and the anticipated state of the state machine to determine whether the state machine is in an inconsistent state. If the current state and the anticipated state match, the analysis module 502 can determined that the state machine is not in an inconsistent state. Alternatively, if the current state and the anticipated state do not match, the analysis module 502 can determine that the state machine is in an inconsistent state.

The health checker 500 can include a state change module 506 configured to cause a state machine in an inconsistent state to change from its current inconsistent state to a new state. The state change module 506 may send a command to the state machine that causes the state machine to perform a specific action or a set of actions resulting in the state machine changing to the new state. For example, the specific actions may include, but are not limited to, reverting the state machine to a previous state that is immediately before the inconsistent state by rolling back changes made on the state machine and/or re-executing a previous action executed by the state machine before the inconsistent state (e.g., resend a message that requires a response), rebooting the state machine, etc. In some embodiments, the state change module 506 may cause one or more processes in the computing network to be terminated to free up resources for the state machine, thereby enabling the state machine to transition from an inconsistent state.

The state change module 506 can determine a new state of a state machine and a suitable action to change a current state of the state machine by analyzing the table of possible states on the state machine based at least upon the current events on the state machine, an anticipated state of the state machine, or the events that have taken place on the state machine. For example, assuming that the present state of the state machine is an "initialization" state and an anticipated state of the state machine is a power-up state, the table may include two possible transitions that can be performed on the state machine to transfer from the "initialization" to two possible subsequent states (e.g., "shut down" or "power up"). The state change module 506 may determine a suitable action, such as "power up," to change the current state (i.e., "initialization") of the state machine to a new state, a "power up state."

In some embodiments, the state change module 506 may use one or more machine learning algorithms to analyze past events that have taken place, current events and/or network resources (e.g., network bandwidth and processing capacity) to determine a new state for the state machine and a suitable action to change a current state of the state machine. For example, a new state may be a previous state immediately before the inconsistent state. The state change module 506 can retrieve the previous action performed by the state machine from the corresponding active log of the state machine and transmit a command causing the state machine to re-execute the previous command.

Subsequent to sending the command to the state machine and causing the state machine to change from the current state, the state change module 506 may communicate with the analysis module 502 to determine whether a consistent state has been reached on the state machine. In an event that the state machine is still in the inconsistent state after a predetermined time period, the state change module 506 may cause a secondary action to be performed. For example, the state change module 506 may cause the state machine to be powered down or send an alert message to an administrator of the state machine.

Figure 6:
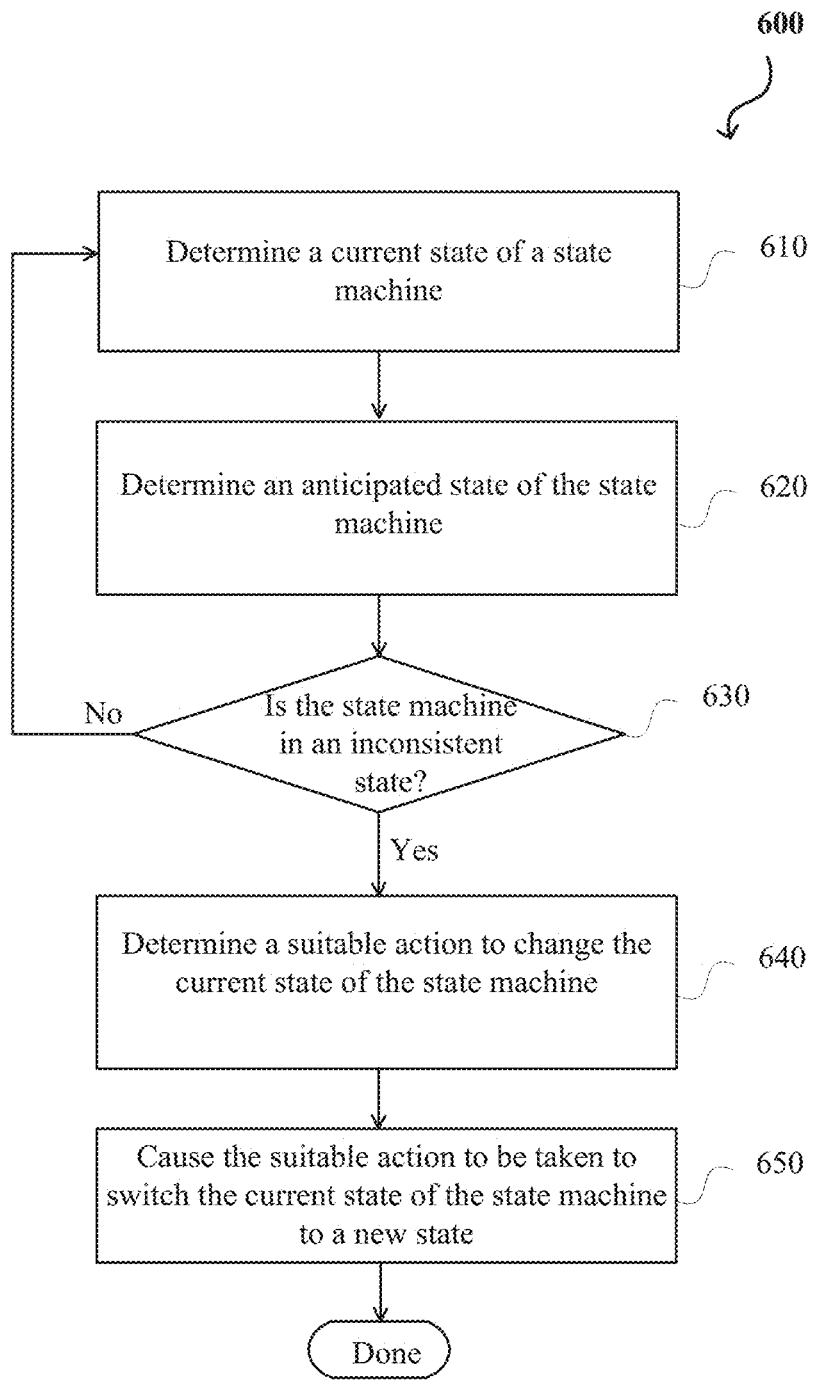
FIG. 6 illustrates an example process of managing statuses of a state machine in a computing network.

Having disclosed some basic system components and concepts, the disclosure now turns to the example method shown in FIG. 6. For the sake of clarity, the method is described in terms of systems 110, 200, 250, 300, 400 and 500, as shown in FIGS. 1-5, configured to practice the method. The steps outlined herein are example and can be implemented in any combination thereof, including combinations that exclude, add, or modify certain steps.

FIG. 6 illustrates an example process 600 of managing states of a state machine in a computing network in accordance with various implementations. It should be understood that there can be additional, fewer, or alternative steps performed in similar or alternative orders, or in parallel, within the scope of the various embodiments unless otherwise stated. The example method 600 begins at step 610 with a health checker 500 determining a current state of a state machine. The health checker 500 can periodically determine the current state of the state machine according to a predefined schedule or in response to certain events happening on the state machine. The health checker 500 can determine the current state of the state machine by querying the state machine, analyzing an active log of the state machine, etc.

At step 620, the health checker 500 can further determine an anticipated state of the state machine. The health checker 500 can determine the anticipated state by analyzing an active log of the state machine or state information of state machines that the state machine has been in communication with, analyzing a table of possible states on the state machine, using one or more machine-learning algorithms, etc.

At step 630, the health checker 500 can determine whether the state machine is in an inconsistent. For example, the health checker 500 can compare the current state of the state machine to an anticipated state of the state machine to determine whether the state machine is in an inconsistent state.

If at step 620 the health checker 500 determines that the state machine is in an inconsistent state, (e.g., the current state does not match the anticipated state), the method can continue to step 640 where the health checker 500 can determine a suitable action to change the current state of the state machine. The suitable action may include, but is not limited to, reverting the state machine to a previous state that is immediately before the inconsistent state by rolling back changes made on the state machine, and re-execute a previous action executed by the state machine before the inconsistent state (e.g., resend a message that requires a response). In some embodiments, a suitable action may be rebooting the state machine or causing one or more processes in the computing network to be terminated to free up resources for the state machine.

At step 650, the health checker can cause the one or suitable actions to be performed by the state machine. For example, the health checker can transmit a command to the state machine or one or more other state machines that have communicated with the state machine to cause the receiving state machine to perform a specified action. The specified action can cause the state machine to change from the inconsistent state to a new state.

As one of ordinary skill in the art will readily recognize, the examples and technologies provided above are simply for clarity and explanation purposes, and can include many additional concepts and variations.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

For clarity of explanation, in some instances the present technology may be presented as including individual functional blocks including functional blocks comprising devices, device components, steps or routines in a method embodied in software, or combinations of hardware and software.

Note that in certain example implementations, the optimization and/or placement functions outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor, or other similar machine, etc.). The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A computer-implemented method comprising:
    determining a plurality of states of a machine, the plurality of states including a current state of a machine and anticipated state of the machine, the anticipated state determined by comparing events that have occurred on the state machine to a table, the table stored via a data storage in communication with the analysis module, the events indicating the state machine has sent a message and has been awaiting a reply to the message in excess of an anticipated time period, the anticipated state determined based on the reply having arrived at the state machine, the anticipated time period determined based on when the reply should have arrived;
    comparing the plurality of states to yield a determination as to whether the machine is in an inconsistent state;
    in response to the determination is the machine is not in the inconsistent state, repeating the determining of the plurality of states; and
    in response to the determination is the machine is in the inconsistent state, switching one of the plurality of states to another state.

2. The computer-implemented method of claim 1, wherein,
    the plurality of states include a current state and an anticipated state, and
    the current state is determined by analyzing an active log of the machine.

3. The computer-implemented method of claim 1, further comprising:
    determining an action to change the inconsistent state, the action including rebooting the machine.

4. The computer-implemented method of claim 1, further comprising:
    determining an action to change the inconsistent state, the action including causing one or more processes to be terminated to free up resources for the machine.

5. The computer-implemented method of claim 1, further comprising:
    in response to the machine being in the inconsistent state, determining a previous state of the machine that is immediately before a current state by looking up a table of possible states on the machine, the table including one or more actions the machine is allowed to perform and all possible states the previous state is allowed to transition to.

6. The computer-implemented method of claim 5, further comprising:
    causing the machine to be reverted to the previous state; and
    causing the one or more actions associated to be re-executed.

7. The computer-implemented method of claim 5, further comprising:
    determining that an old state is removed from the machine or a new state is added to the machine; and
    updating one or more entries of the table associated with the old state or the new state.

8. The computer-implemented method of claim 1, further comprising:
    periodically determining a current state of the machine is according to a predefined schedule or in response to at least one particular event happening on the machine.

9. A system comprising:
    at least one processor; and
    memory including instructions that, when executed by the at least one processor, cause the system to:
        determine a plurality of states of a machine, the plurality of states including a current state of a machine and anticipated state of the machine, the anticipated state determined by comparing events that have occurred on the state machine to a table, the table stored via a data storage in communication with the analysis module, the events indicating the state machine has sent a message and has been awaiting a reply to the message in excess of an anticipated time period, the anticipated state determined based on the reply having arrived at the state machine, the anticipated time period determined based on when the reply should have arrived;
        compare the plurality of states to yield a determination as to whether the machine is in an inconsistent state;
        in response to the determination is the machine is not in the inconsistent state, repeat the determining of the plurality of states; and
        in response to the determination is the machine is in the inconsistent state, switch one of the plurality of states to another state.

10. The system of claim 9, wherein,
    the plurality of states include a current state and an anticipated state, and
    the current state of the machine is determined by analyzing an active log of the machine.

11. The system of claim 9,
wherein,
the instructions when executed further cause the system to determine an action to change the inconsistent state, and
the action includes rebooting the machine.

12. The system of claim 9,
wherein,
the instructions when executed further cause the system to determine an action to change the inconsistent state, and
the action includes causing one or more processes to be terminated to free up resources for the machine.

13. The system of claim 9,
wherein,
the instructions when executed further cause the system to, in response to the machine being in the inconsistent state, determine a previous state of the machine that is immediately before a current state by looking up a table of possible states on the machine, and
the table includes one or more actions that the machine is allowed to perform and all possible states that the previous state is allowed to transition to.

14. The system of claim 13,
wherein the instructions when executed further cause the system to:
cause the machine to be reverted to the previous state; and
cause one or more actions associated with the previous state of the machine to be re-executed.

15. The system of claim 13,
wherein the instructions when executed further cause the system to:
determine that an old state is removed from machine or a new state is added to the machine; and
update one or more entries of the table associated with the old state or the new state.

16. The system of claim 9, wherein the instructions when executed further cause the system to periodically determine a current state of the machine according to a predefined schedule or in response to at least one particular event happening on the machine.

17. A non-transitory computer-readable storage medium including instructions that, when executed by at least one processor of a computing system, cause the computing system to perform operations comprising:
determine a plurality of states of a machine, the plurality of states including a current state of a machine and anticipated state of the machine, the anticipated state determined by comparing events that have occurred on the state machine to a table, the table stored via a data storage in communication with the analysis module, the events indicating the state machine has sent a message and has been awaiting a reply to the message in excess of an anticipated time period, the anticipated state determined based on the reply having arrived at the state machine, the anticipated time period determined based on when the reply should have arrived;
compare the plurality of states to yield a determination as to whether the machine is in an inconsistent state;
in response to the determination is the machine is not in the inconsistent state, repeat the determining of the plurality of states; and
in response to the determination is the machine is in the inconsistent state, switch one of the plurality of states to another state.

18. The non-transitory computer-readable storage medium of claim 17,
wherein,
the instructions, when executed by the at least one processor, further cause the computing system to, in response to the machine being in the inconsistent state, determine a previous state of the machine that is immediately before a current state by looking up a table of possible states on the machine, and
the table includes one or more actions that the machine is allowed to perform and all possible states that the previous state is allowed to transition to.

19. The non-transitory computer-readable storage medium of claim 18, wherein the instructions, when executed by the at least one processor, further cause the computing system to:
cause the machine to be reverted to the previous state; and
cause one or more actions associated with the previous state of the machine to be re-executed.

20. The non-transitory computer-readable storage medium of claim 18, wherein the instructions, when executed by the at least one processor, further cause the computing system to:
determine that an old state is removed from the machine or a new state is added to the machine; and
update one or more entries of the table associated with the old state or the new state.

\* \* \* \* \*